Feb. 10, 1970    E. C. DUDEK    3,494,390
SABRE SAWS WITH 360° SWIVEL SAW BAR
Filed March 18, 1968    2 Sheets-Sheet 1
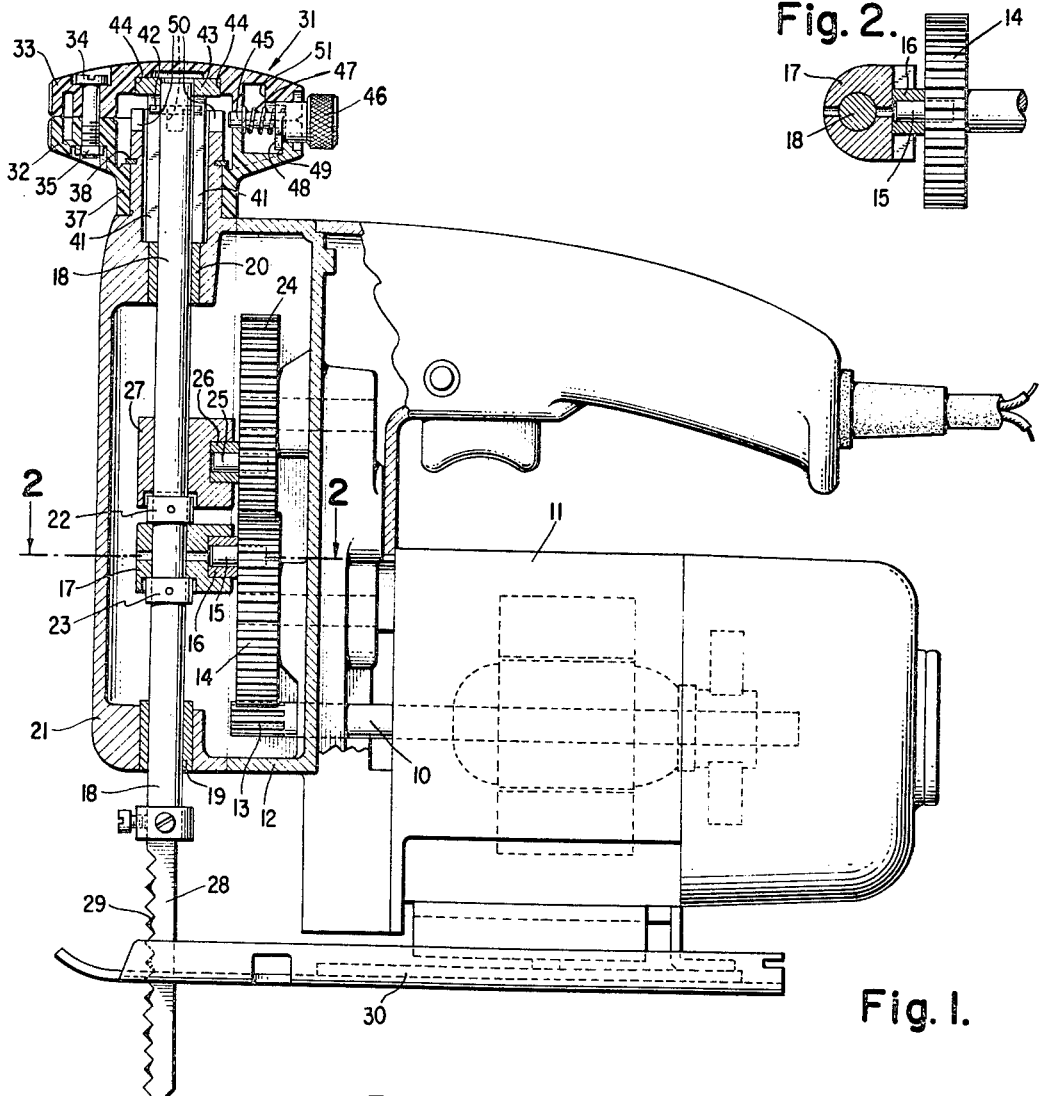
Fig. 2.
Fig. 1.
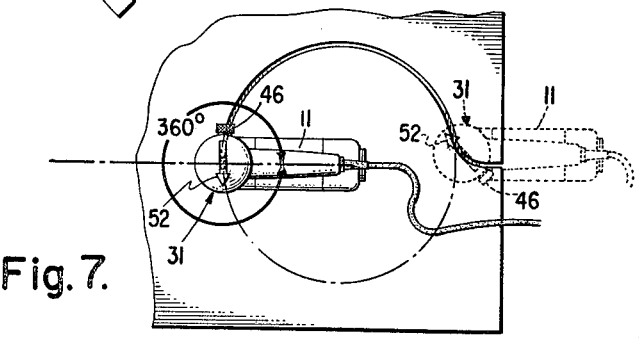
Fig. 7.
WITNESS
Nicholas Leszcak
INVENTOR.
Edmund C. Dudek
BY
Robert E. Smith
ATTORNEY

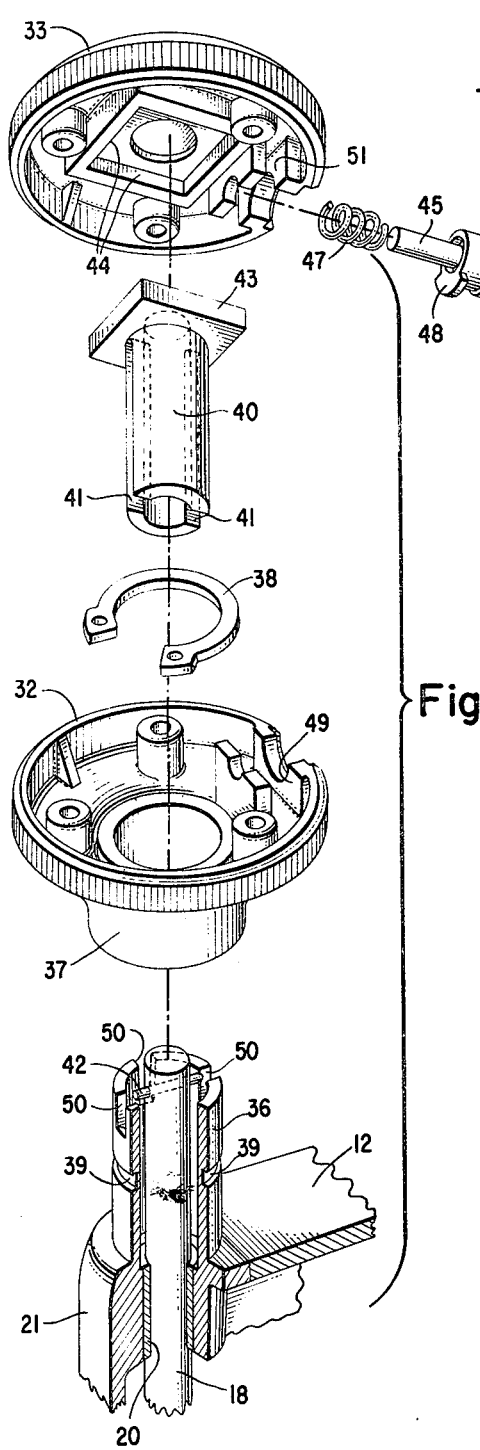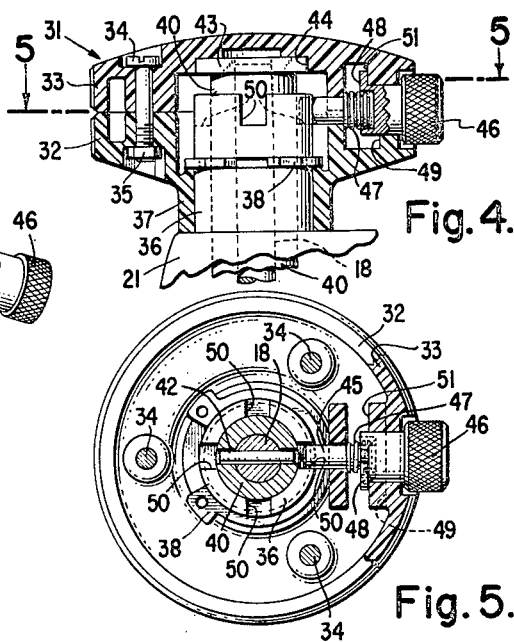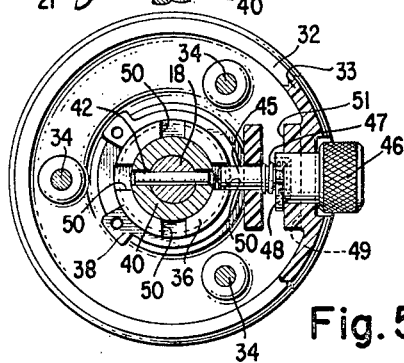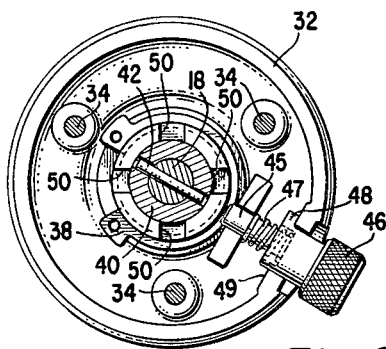

United States Patent Office 3,494,390
Patented Feb. 10, 1970

3,494,390
SABRE SAWS WITH 360° SWIVEL SAW BAR
Edmund C. Dudek, Oak Brook, Ill., assignor to The Singer Company, New York, N.Y., a corporation of New Jersey
Filed Mar. 18, 1968, Ser. No. 713,713
Int. Cl. B27b *19/08*
U.S. Cl. 143—68                                                     9 Claims

ABSTRACT OF THE DISCLOSURE

A sabre saw is provided with means for driving the saw bar in a linear reciprocatory motion from a rotary electric motor while at the same time permitting the saw bar to be manually rotated, if desired, about its own axis to set the cutting edge of the saw blade in different angularly oblique positions relative to the line of movement of the tool. A control knob journaled on a hub extension of the stationary housing is coupled to the saw bar by means of a slotted sleeve keyed for rotation with the saw bar by a pin fixed to the saw bar but slidable in the slotted portion of the sleeve. The sleeve is formed with a non-circular flange held captive within the upper half of the control knob which is split for ease of assembly. The saw bar slides up and down within the sleeve and its angular position is controlled by the angular position of the sleeve which guides the pin, said sleeve being controlled in angular position by the knob. A spring-retractable pin operatively secured to the control knob provides means for selectively locking the saw bar in a normal angular position for use as a conventional sabre saw or for unlocking the saw bar when it is desired to manually control the position of the cutting edge as in scroll cutting. The retractable pin is slidable transversely in the control knob and may be inserted into slots formed in the hub extension when the control knob is turned to align the pin with a selected slot. The pin is rotatable to a cammed position which retains the pin in inserted position.

BACKGROUND OF THE INVENTION

While the concept of rotating a saw bar of a sabre saw about its own axis is old as shown in the Bechtold U.S. Patent No. 2,547,922, so far as I am aware, no commercially successful sabre saw having this concept has yet appeared on the market.

One reason for this is that there has not been heretofore devised an effective means for controlling the angular position of a reciprocating saw bar, which means can be readily assembled in mass production without adding substantially to the cost of the tool.

The prior Bechtold device for example requires a saw bar having in one end a square bore which is difficult and costly to fabricate. The prior art locking means is frictional and not positive and the control knob and associated parts, to be effective, must be fabricated largely of metal which is expensive.

SUMMARY OF THE INVENTION

It is therefore an object of this invention to provide effective means for selectively and manually controlling the angular position of the saw bar of a sabre saw about its own axis during the cutting operation without adding substantially to the production cost of the tool.

It is a further object of this invention to provide structure as above described which does not require expensive modification of existing structure, particularly the saw bar itself.

In attaining the objects of this invention the saw bar need be modified only to the extent of providing a single transverse guide pin and two collars to transmit reciprocatory motion from the crosshead while permitting the saw bar to turn about its longitudinal axis.

In further attaining the objects of this invention, a split control knob and its associated structure are made largely of inexpensive molded parts which can be easily assembled in interfitted relation and only the small parts requiring strength and wear resistance need be fabricated of metal.

IN THE DRAWINGS

FIG. 1 is a longitudinal elevation partly in section of a sabre saw illustrating an embodiment of this invention.

FIG. 2 is a sectional view taken on line 2—2 of FIG. 1.

FIG. 3 is a disassembled perspective view illustrating in detail the structure and assembly of the control knob and associated parts.

FIG. 4 is a detailed transverse section taken through the control knob showing the arrangement of internal parts.

FIG. 5 is a sectional view taken on line 5—5 of FIG. 4.

FIG. 6 is a sectional view similar to that of FIG. 5, but with the control knob rotated from the position shown in FIG. 5.

FIG. 7 is a plan view illustrating the use of the sabre saw of this invention in cutting a circular disc from a work-piece.

DESCRIPTION OF THE INVENTION

Referring now to FIG. 1, a shaft 10 of a driving electric motor mounted in housing 11 extends into the gear housing 12 and is formed with a splined portion 13 which meshes with and drives a gear 14 journaled in the gear housing. The gear 14 carries an eccentric pin 15 surmounted by a roller 16 which engages the slide portion of a crosshead 17.

A saw bar 18, journaled for linear endwise movement in bearings 19 and 20 secured in a gear housing cover 21, is free to turn about its own longitudinal axis with respect to the crosshead 17. However, collars 22 and 23, secured to the saw bar 18 by any suitable means are positioned on axially opposite sides of and close to the crosshead 17 and serve to transmit linear reciprocatory motion from the crosshead 17 to the saw bar 18.

A gear 24 journaled in the gear housing 12 meshes with gear 14 and by means of eccentric pin 25 and roller 26 drives an upper balancing crosshead 27 which is free to turn and slide on the saw bar 18.

From the above description, it will be seen that the motor shaft 10 drives the gear 14 which, through pin 15 and roller 16 working in crosshead 17, transmits linear axial reciprocatory motion to the saw bar 18 and drives an affixed saw blade 28 having a cutting edge 29 in a linear reciprocatory path substantially normal to the plane of a work-contacting shoe 30. As thus far described, there is no structure for determining the angular position of the saw bar 18 about its own axis and thus no means for presenting the cutting edge 29 of the blade 28 in a predetermined angular position with respect to the work. Structure similar to the above, except that the crosshead is securely clamped to the saw bar, is shown and described in the Happe U.S. Patent No. 3,205,722 to which reference may be had for a more complete understanding thereof.

There will now be described structure according to this invention for selectively and manually controlling the angular position of the saw bar 18 while it is reciprocating to provide the cutting strokes for the saw blade 28.

Referring to FIGS. 1 and 3, a control knob indicated generally as 31 is split for ease of assembly to form a lower half 32 and an upper half 33 which are subsequently interfitted to contain internal parts to be described and are secured together finally by means of screws 34 and nuts 35.

The gear housing cover 21 is formed with a hollow cylindrical hub extension 36 within which the upper end portion of the saw bar 18 may freely reciprocate. The lower half 32 of the knob is formed with an apertured shank portion 37 which is slidably received on the extension 36 for journaling the knob 31 in the tool housing. A split snap-ring 38 received in a groove 39 retains the knob 31 on the extension 36.

A cylindrical sleeve 40 having diametrically positioned slots 41 is slidably received on the end portion of saw bar 18 with a pin 42 secured to the saw bar and in slidable guiding engagement with the slots 41. The pin 42 is preferably secured to the saw bar 18 in such a position that its axis lies in the plane of the blade 28.

The sleeve 40 seats freely within the hollow extension 36 with its lower end substantially abutting the bearing 20.

A non-circular flange 43 formed on the sleeve 40 is received in a non-circular seat 44 formed in the upper knob half 33 to lock the sleeve 40 for rotation with the knob 31.

A retractable pin 45 is held captive within knob 31 for rotatable and slidable movement imparted thereto by means of a knob 46 which is externally accessible. Normally the pin 45 is held in its retracted position by a compression spring 47 as shown in FIGS. 1 and 6 and, when in this position, it is clear that the saw bar 18 may be freely turned by means of control knob 31 to provide any desired angular position of the blade 28. In this position of the pin 45 a cam portion 48 is retained against the boss 49 formed on the knob half 32 by pressure exerted by spring 47. When the knob 31 is turned to bring the pin 45 into alignment with one of the slots or notches 50 formed in the hub extension 36, the knob 46 may be pushed and turned to bring the cam portion 48 in engagement with the boss 51 formed on the knob half 33. This retains the pin 45 in locked engagement with the notch 50 and effectively locks the saw bar 18 in a specific angular position for cutting as in a regular sabre saw. This position is illustrated in FIGS. 4 and 5.

Inasmuch as the position of the saw bar 18 and thus the saw blade 28 is always controlled by the position of the control knob 31, it may be provided with a fixed index mark 52 as seen in FIG. 7 to indicate at all times the direction in which the cut is being made and thus assist the operator in following any desired pattern.

From the above it will be evident that, except for the conventional hardware fastening elements, the only special parts required to be made of metal are the sleeve 40 the pin 42, and the pin 45.

All the remaining parts are readily made of molded plastic material and are inherently low cost and without compromising the effective operation of the device. The heavy section of plastic material surrounding the seat 44 is sufficiently strong to transmit torque from the control knob 31 to the sleeve 40 and through pin 42 to the saw bar 18. The only parts subjected to continuous frictional wear are the saw bar 18, the pin 42 and the sleeve 40 which are all made of metal for long useful life.

While there has been illustrated in this embodiment four notches 50 for selected locked positions of the saw bar 18, it will be apparent to those skilled in the art that other notches may be made in the extension 36 to provide any desired locked positions for the saw bar.

Reference to FIG. 3 will show the simple, straightforward assembly having no critical fits provided by the structure of this invention which is a feature of great practical importance in reducing the production costs of mass-manufactured devices of this kind.

It will be noted that, with this construction, the free end of the saw bar 18 extends substantially into the body of the control knob 31 even in its lowest position of reciprocation. This provides a close-coupled rigid control of the saw bar by the knob and results in more accurate control of the saw blade 28 in following a desired pattern contour.

FIG. 7 illustrates a sabre saw embodying this invention being used as a scroll saw to cut a circular disc from a work piece. If a conventional sabre saw, i.e., one not having the swiveling saw bar feature of this invention, is used to follow a curved pattern of this kind, it is necessary to orient the entire tool to follow the curve. This involves the controlled guiding and turning of considerable mass from a position offset from the cutting axis of the tool which becomes increasingly difficult as the radius of curvature becomes small relative to the tool dimensions.

With the emphasis now being placed, by the attributes of this invention, on guiding the saw bar from a position directly above the cutting axis of the tool and requiring only the turning of the small mass of the saw bar itself it now becomes possible to readily and accurately cut intricate patterns with a portable power tool of large capacity. With the full 360 degree swiveling of the saw bar quite independently of the rest of the tool body, it is only necessary to use the single control knob 31 to guide the cutting edge 29 as desired and let the body of the tool assume any angle that it may be required to take. Thus, it is possible to make cuts with the swiveling feature which would not even be possible with ordinary sabre saws because of the presence of obstacles which would not permit the sabre saw to be bodily turned as required to make the cut.

What is claimed is:

1. In a power operated portable saw having a housing and a saw bar including driving means for reciprocating the saw bar along a linear axis while permitting the saw bar to freely be rotated about said axis, means controlling the rotation of said saw bar comprising:
    (a) a sleeve slidable on the saw bar and formed with a longitudinal slot parallel to the axis,
    (b) a pin fixed to the saw bar transversely of the axis and slidably engaged with the slot,
    (c) a control knob journaled on a hub extension of the housing for rotation thereof about the axis,
    (d) a notch formed in said housing extension,
    (e) flange means securing the sleeve to the knob for rotation therewith,
    (f) a retractable pin slidable in the knob in a path transverse to the axis to engage the notch when in alignment therewith, and
    (g) means carried by the knob and externally accessible for moving the retractable pin into and out of its engaged position with the notch.

2. The combination of claim 1 wherein:
    (a) the control knob is split along a transverse plane to form first and second knob halves,
    (b) a snap ring secured to the hub extension retains the first knob half in journaled position on the extension, and
    (c) the second knob half is secured to the first knob half to form an enclosure for the retractable pin.

3. The combination of claim 1 wherein:
    (a) the hub extension is formed as a hollow cylinder coaxial with the saw bar, and
    (b) the sleeve is freely seated within the hub extension.

4. The combination of claim 1 wherein:
    (a) the free end of the saw bar extends substantially within the body of the knob in all operating positions.

5. The combination of claim 1 wherein:
    (a) a saw blade is secured to the saw bar, and
    (b) the pin fixed to the saw bar lies with its axis in the plane of the saw blade.

6. In a power operated portable saw having a housing and a saw bar including driving means for reciprocating the saw bar along a linear axis while permitting the saw bar to freely be rotated about said axis, means controlling the rotation of said saw bar comprising:
(a) a sleeve slidable on the saw bar and formed with a longitudinal slot parallel to the axis,
(b) a pin fixed to the saw bar transversely of the axis and slidably engaged with the slot of the sleeve,
(c) a control means journaled in the housing for rotation thereof about said axis,
(d) the control means securing the sleeve thereto to control the rotation thereof, and
(e) locking means carried by the control means for selectively locking the angular position of the saw bar relative its axis.

7. The combination claimed in claim 6 wherein:
(a) the locking means has a locked position and an unlocked position whereby in the locked position the saw bar will be locked at a fixed angle about its axis, while in the unlocked position the angular position of the saw bar will be either operator controlled or freely rotatable relative said axis.

8. In a power operated portable saw having a housing and a saw bar including driving means for reciprocating the saw bar along a linear axis while permitting the saw bar to freely be rotated about said axis, means controlling the rotation of said saw bar comprising:

(a) a sleeve disposed about the saw bar and formed with a longitudinal slot parallel to the axis,
(b) a pin fixed to the saw bar transversely of the axis and slidably engaged with the slot of the sleeve,
(c) a control means journaled in the housing for rotation thereof about said axis,
(d) the control means securing the sleeve thereto to control the rotation thereof.

9. The combination claimed in claim 8 wherein:
(a) locking means carried by the housing for selectively locking the angular position of the saw bar relative its axis.

References Cited

UNITED STATES PATENTS

| 2,547,922 | 4/1951 | Bechtold. |
| 2,588,477 | 3/1952 | Briggs. |
| 2,601,877 | 7/1952 | Van Dam _____ 143—74 X |

DONALD R. SCHRAN, Primary Examiner

U.S. Cl. X.R.
30—166